Aug. 14, 1928.  
W. BOCK  
1,680,589  
THERMOELECTRIC STRESS METER  
Filed Aug. 20, 1925
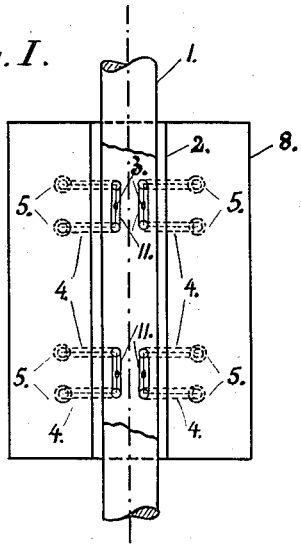
Fig. I.
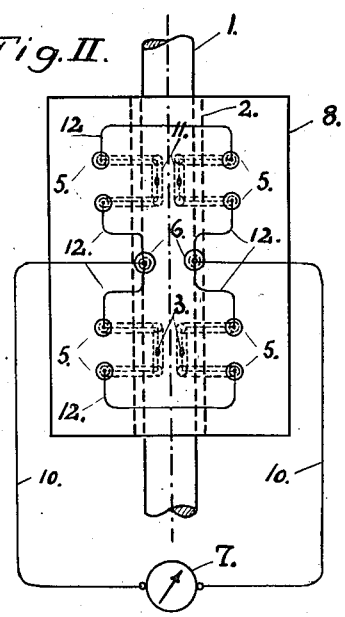
Fig. II.
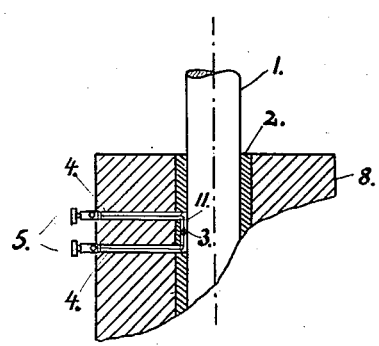
Fig. IV.
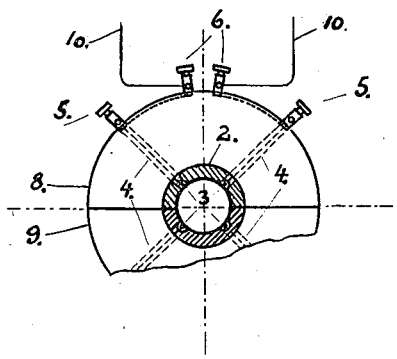
Fig. III.
Inventor  
Wilhelm Bock Patented Aug. 14, 1928.

1,680,589

UNITED STATES PATENT OFFICE.

WILHELM BOCK, OF PASSAIC, NEW JERSEY.

THERMOELECTRIC STRESS METER.

Application filed August 20, 1925, Serial No. 51,467, and in Germany October 22, 1924.

This invention relates to a device for measuring the temperature and stress of solid materials, the device being conveniently referred to as a "thermoelectric stress-meter." The invention has for its object the determination of the intensity of stress in solid bodies by measuring the temperature changes of the material undergoing deformation or strain.

According to thermodynamic theory as expressed by Lord Kelvin, a bar, or rod, or wire of any substance experiencing any degree of end thrust, to begin with, becomes cooled if suddenly elongated by end pull, or by diminution of end thrust, and warmed if suddenly shortened by end thrust or diminution of end pull. It has further been established that a metal pulled in the direction of its length cools to a certain temperature, and then, after the metal has reached a certain point of stress known as the elastic limit, its temperature reverses and rises until the breaking point is reached. The yield point, the intensity of stress beyond which the change in length increases rapidly with little if any increase in stress, is marked by a sudden sharp rising of the temperature. In every case the corresponding relations between temperature and stress depend on the kind of metal being tested and its cross-sectional area.

My invention comprises an apparatus for measuring the intensity of tensile, compressive, or shearing stress in solid bodies and for testing the strength of materials in accordance with the thermodynamic principles above mentioned. For a full understanding of the invention, its advanges and specific objects, reference should be had to the accompanying drawings and descriptive matter, in which I have illustrated and described a preferred embodiment of the invention.

Of the drawings:

Fig. I is a vertical section of the apparatus showing a portion of the material to be tested;

Fig. II is a front elevation of the apparatus showing diagrammatically the thermoelements and galvanometer;

Fig. III is a horizontal cross-section of the apparatus shown in Fig. II; and,

Fig. IV is a vertical section of a portion of the apparatus showing the terminals of a thermocouple.

In the drawings the material to be tested is shown as a metal bar 1. Enveloping the bar 1 is a sleeve longitudinally divided into halves 8 and 9, the parts being insulated from the bar 1 by means of a rubber lining 2 which immediately surrounds the material to be tested. In the recesses 11 of the lining 2 at the inner periphery of the sleeve 8, 9, as best shown in Fig. IV, are lodged the first or fused junctions 3 of the thermocouples which are adjacent the bar 1, and in thermal relation therewith while the recesses 11 prevent electrical contact with the bar 1.

The thermoelements consisting of dissimilar metals or alloys extend from the fused junctions 3 through radial channels 4 to the second junctions 5 at the outer periphery of the sleeve 89. The second junctions 5 are maintained at a constant temperature, such as that of the atmosphere. Preferably the terminals of the second junctions 5 are connected in groups, as shown, the positive terminals being connected on the one side and the negative terminals on the other side with the main terminals 6 by means of the wires 12. The main terminals 6 in turn are connected through the wires 10 with the galvanometer 7 which indicates the difference in temperature between the first junctions 3 and the second junctions 5 of the thermocouples.

During the process of strain or deformation of the bar 1, the intensity of stress may readily be determined by the temperature indications of the galvanometer 7. In case the bar 1 is under tensile stress it will gradually cool as the stress increases and accordingly the temperature of the first junctions will decrease. On the other hand, if the bar 1 is subject to compression, the temperature of the first junctions will gradually increase according to the intensity of the stress. In both cases the temperature of the second junctions will remain constant. By predetermining the relation between temperature and stress in a given metal, one can readily convert the measurement in temperature into a measurement in pounds of stress per unit area. In fact, the galvanometer scale may be graduated to read either in electric potential or in units of temperature or in units of stress.

Furthermore, it is possible to determine the elastic limits and yield points of different metals by means of this apparatus which can be conveniently employed in laboratories for this purpose. The stress-meter is also useful for the determination of stress in parts of iron or steel constructions such as bridges, cranes, or scales under varying conditions of load and parts of the frames of dirigibles and aeroplanes. In fact, it will be apparent that my invention may be used for a great variety of useful purposes.

While I have illustrated and described one form of embodiment of my invention now known to me, to those skilled in the art it will be obvious that changes may be made in the form of the apparatus and the electrical connections without departing from the spirit of my invention as set forth in the appended claims.

Having thus described my invention, what I claim as new and desire to secure by Letters Patent is:

1. A thermoelectric device for determining the intensity of stress in solid materials comprising a first junction adjacent the material to be tested, a second junction insulated therefrom, and means for indicating the temperature difference between said first and second junctions.

2. A thermoelectric device for determining the intensity of stress in solid materials comprising a first junction adjacent the material to be tested, a second junction insulated therefrom, and a galvanometer for indicating the temperature difference between said first and second junctions.

3. A device for determining the strength of solid materials under tensile or compressive stress comprising a thermocouple having a first junction in proximity to the material to be tested, and a second junction maintained at atmospheric temperature, an insulated lining enveloping said material and retaining said first junction in thermal communication therewith, and means for measuring the electromotive force generated between the first and second junctions of said thermocouple.

4. A thermoelectric device for determining the intensity of stress in metals comprising a sleeve with radial channels surrounding the material to be tested and insulated therefrom, a series of first junctions arranged at the inner periphery of said sleeve, a series of second junctions arranged at the outer periphery of said sleeve, dissimilar metal wires in said radial channels connecting said first and second junctions, and means for indicating the temperature difference between said first and second junctions.

5. A thermoelectric device for determining the intensity of stress in solid bodies comprising a number of first junctions adjacent the material to be tested and in thermal communication therewith, a number of second junction terminals insulated therefrom, said second junction terminals being connected in groups, and means for measuring the electromotive force generated between said first and second junctions.

WILHELM BOCK.